US012522685B2

(12) United States Patent
Griesgraber et al.

(10) Patent No.: US 12,522,685 B2
(45) Date of Patent: Jan. 13, 2026

(54) BLOCK COPOLYMERS WITH A FLUORINATED BLOCK AND A PHOSPHORUS-CONTAINING BLOCK

(71) Applicant: Solventum Intellectual Properties Company, Maplewood, MN (US)

(72) Inventors: George W. Griesgraber, Eagan, MN (US); Federica Sgolastra, Woodbury, MN (US); Semra Colak Atan, Saint Louis Park, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 830 days.

(21) Appl. No.: 17/756,323

(22) PCT Filed: Dec. 8, 2020

(86) PCT No.: PCT/IB2020/061651
§ 371 (c)(1),
(2) Date: May 23, 2022

(87) PCT Pub. No.: WO2021/124019
PCT Pub. Date: Jun. 24, 2021

(65) Prior Publication Data
US 2023/0026581 A1 Jan. 26, 2023

(51) Int. Cl.
*C08F 293/00* (2006.01)
*C09D 153/00* (2006.01)

(52) U.S. Cl.
CPC .......... *C08F 293/00* (2013.01); *C09D 153/00* (2013.01)

(58) Field of Classification Search
None
See application file for complete search history.

(56) References Cited

U.S. PATENT DOCUMENTS

| 346,201 A | 7/1886 | Hibrager |
|---|---|---|
| 7,662,896 B2 | 2/2010 | Savu et al. |
| 2004/0202634 A1* | 10/2004 | L'Alloret ............... A61Q 19/00 424/70.16 |
| 2010/0183889 A1 | 7/2010 | Dams et al. |
| 2016/0046746 A1 | 2/2016 | Ameduri et al. |
| 2017/0226372 A1 | 8/2017 | Jariwala et al. |

FOREIGN PATENT DOCUMENTS

| EP | 2444428 A | 4/2012 | |
|---|---|---|---|
| JP | 2017078105 A | 4/2017 | |
| WO | 2000077101 A1 | 12/2000 | |
| WO | 2009088604 A1 | 7/2009 | |
| WO | 2012061021 A1 | 5/2012 | |
| WO | 2016099952 A1 | 6/2016 | |
| WO | 2017142802 A1 | 8/2017 | |
| WO | 2018013330 A1 | 1/2018 | |
| WO | WO-2018118905 A1 * | 6/2018 | ............ C08F 265/06 |
| WO | 2019123124 A1 | 6/2019 | |
| WO | 2021059072 A1 | 4/2021 | |

OTHER PUBLICATIONS

Chojnacka, K., et al., ( Inter-element interactions in human hair Environmental Toxicology and Pharmacology vol. 20, Issue 2, Sep. 2005, pp. 368-374) (Year: 2005).*
David, "Recent Progress on Phosphonate Vinyl Monomers and Polymers Therefore Obtained by Radical (co) Polymerization", Polymer Chemistry, 2012, vol. 3, No. 2, pp. 265-274.
Inoue, "Surface Characteristics of Block-Type Copolymer Composed of Semi-fluorinated and Phospholipid Segments Synthesized by Living Radical Polymerization", Journal of Biomaterials Science, Polymer Edition, 2004, vol. 15, No. 9, pp. 1153-1166.
International Search Report for PCT Application No. PCT/IB2020/061651, mailed on Feb. 16, 2021, 5 pages.
Lei, "Bioinspired Amphiphilic Phosphate Block Copolymers as Non-fluoride Materials to Prevent Dental Erosion", The Royal Society of Chemistry Advances, 2014, vol. 4, pp. 49053 49060.
Moszner, "Chemical Aspects of Self-Etching Enamel-Dentin Adhesives: A Systematic Review", Dental Materials, 2005, vol. 21, No. 10, pp. 895-910.
Suzuki, "Synthesis of Soluble Phosphate Polymers by RAFT and Their in Vitro Mineralization", Biomacromolecules, 2006, vol. 7, No. 11, pp. 3178-3187.

* cited by examiner

*Primary Examiner* — Robert S Jones, Jr.
*Assistant Examiner* — Lily K Sloan

(57) ABSTRACT

A block copolymer is provided that includes a first block having pendant phosphorus-containing groups and a second block having fluorinated groups. Compositions containing the block copolymer as well as articles that include the block copolymer are also provided. The block copolymer can be used to provide a lower surface energy to a surface, particularly a metal-containing surface.

13 Claims, No Drawings

US 12,522,685 B2

BLOCK COPOLYMERS WITH A FLUORINATED BLOCK AND A PHOSPHORUS-CONTAINING BLOCK

CROSS REFERENCE TO RELATED APPLICATIONS

This application is a national stage filing under 35 U.S.C. 371 of PCT/IB2020/061651, filed Dec. 8, 2020, which claims the benefit of U.S. Provisional Patent Application No. 62/950,224, filed Dec. 19, 2019, the disclosure of which is incorporated by reference in its/their entirety herein.

BACKGROUND

Objects having metal- or metal oxide-containing surfaces can be marred or defaced by paint, ink, or other fluids carrying dyes, pigments, and other colorants. Adhesives also adhere well to such metal-containing surfaces. Objects having these types of surfaces are numerous and include bridges, cars, trucks, elevators, escalators, lockers, doors, tables, signs, display screens, and many other items. Modification of such metal-containing surfaces would be desirable to make them impervious to fluids carrying dyes, pigments, or other colorants (e.g., in the form of graffiti) and resistant to chemical/oxidative corrosion. Also, it would be desirable to modify a metal-containing surface to make the removal of adhesives (e.g., from tapes) easier.

Fluoropolymer compositions are known to generate low surface energy coatings on such metal-containing surfaces. There is a desire for new compositions that are less expensive, more robust, and/or better performing than current low energy fluoropolymer coating compositions.

SUMMARY

A block copolymer is provided that includes a first block having pendant phosphorus-containing groups and a second block having pendant fluorinated groups. Compositions containing the block copolymer as well as articles that include the block copolymer are also provided.

The block copolymer can be used to treat a metal-containing surface to provide a surface that has lower surface energy than the native metal-containing surface. The lower surface energy provides a surface that has a lower peel force, relative to the untreated metal-containing surface, for applied adhesive compositions making removal of the applied adhesive compositions easier. Surprisingly, the block copolymers of the present disclosure also provide a lower surface energy and, thus, a lower peel force, relative to the same surface treated with a random copolymer of the same monomers, for applied adhesive compositions making removal of the applied adhesive compositions easier. The applied block copolymer may also passivate the metal-containing surface to improve chemical/corrosion resistance to the underlying metal-containing substrate, and provide a more robust surface (e.g., more resistant to abrasion).

In a first aspect, a block copolymer is provided. Preferably, the block copolymer is a BAB triblock copolymer. The A block, or middle block, contains multiple monomeric units derived from a monomer comprising a (meth)acryloyl group and a phosphorus-containing group. The B blocks contain multiple monomer units derived from a monomer comprising a (meth)acryloyl group and a fluorinated group.

In a second aspect, a coating composition is provided that includes a) a block copolymer (preferably, a BAB triblock copolymer) as described above in the first aspect and b) an organic solvent. The block copolymer is dissolved or dispersed in the organic solvent.

In a third aspect, an article is provided that includes a) a substrate and b) a coating layer (e.g., a hardened or dried coating layer) positioned adjacent to the substrate, wherein the coating layer contains a block copolymer as described above in the first aspect.

In a fourth aspect, a method of coating a substrate is provided. The method includes providing a block copolymer as described herein. The block copolymer may be in a coating composition that also includes an organic solvent in which the block copolymer is dissolved or dispersed. The method further includes applying the block copolymer to the substrate to form a coating layer that is adjacent to the substrate.

Definitions

As used herein, "alkyl" refers to a monovalent group that is a radical of an alkane and includes straight-chain, branched, cyclic, and bicyclic alkyl groups, and combinations thereof. Unless otherwise indicated, the alkyl groups typically contain from 1 to 20 carbon atoms. In some embodiments, the alkyl groups contain 1 to 10 carbon atoms, 2 to 10 carbon atoms, 1 to 6 carbon atoms, 2 to 6 carbon atoms, 1 to 4 carbon atoms, or 2 to 4 carbon atoms. Cyclic alkyl groups and branched alkyl groups have at least three carbon atoms. Examples of alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 20 carbon atoms. In some embodiments, the alkylene group has 1 to 10 carbon atoms, 2 to 10 carbon atoms, 1 to 6 carbon atoms, 2 to 6 carbon atoms, 1 to 4 carbon atoms, or 2 to 4 carbon atoms. Cyclic and branched alkylene groups have at least 3 carbon atoms. Suitable alkylene groups include, for example, methylene, ethylene, propylene, 1,4-butylene, 1,4-cyclohexylene, and 1,4-cyclohexyldimethylene.

The term "heteroalkylene" refers to an alkylene group that has at least one —$CH_2$— group replaced with a heteroatom such as sulfur, oxygen, or nitrogen. The heteroatom is typically in the form of an oxy group (—O—), thio group (—S—), or —NH— group. The heteroalkylene typically has at least one carbon atom (—$CH_2$— group) on either side of each heteroatom.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to or connected to the aromatic ring. Unless otherwise indicated, the aryl groups typically contain from 6 to 20 carbon atoms. In some embodiments, the aryl groups contain 6 to 18, 6 to 16, 6 to 12, or 6 to 10 carbon atoms. Examples of an aryl group include phenyl, naphthyl, biphenyl, phenanthryl, and anthracyl.

The term "aralkyl" refers to a monovalent group that is an alkyl group substituted with an aryl group (e.g., as in a benzyl group). The term "alkaryl" refers to a monovalent group that is an aryl substituted with an alkyl group (e.g., as in a tolyl group). Unless otherwise indicated, for both groups, the alkyl portion often has 1 to 10 carbon atoms, 1 to 6 carbon atoms, or 1 to 4 carbon atoms, and an aryl portion often has 6 to 20 carbon atoms, 6 to 18 carbon atoms, 6 to 16 carbon atoms, 6 to 12 carbon atoms, or 6 to 10 carbon atoms.

The term "(meth)acryloyl" refers to a monovalent group of formula $CH_2=CR-(CO)-$ where R is hydrogen for an acryloyl group and methyl for a methacryloyl group and where $-(CO)-$ refers to a carbonyl group.

A "phosphorus-containing group" refers to a phosphonate group, phosphate group, phosphonic acid group, phosphoric acid group, phosphonic acid ester group, or phosphoric acid ester group.

A "phosphonate" group is an anion of formula $-PO_3^{-2}$ or $-PO_3H^{-1}$ where the charge of the anion is balanced with a cation.

A "phosphate" group is an anion of the formula $-PO_4H^{-1}$ or $-PO_4^{-2}$ where the charge of the anion is balanced with a cation.

A "phosphonic acid" is a group of the formula $-PO(OH)_2$.

A "phosphoric acid" is a group of the formula $-OPO(OH)_2$.

A "phosphonic acid ester" is a group of formula $-PO(OR^{20})_2$ where $R^{20}$ is alkyl or aralkyl.

A "phosphoric acid ester" is a group of formula $-OPO(OR^{20})_2$ where $R^{20}$ is alkyl or aralkyl.

A "coating" may be a layer of a coating composition that includes a polymeric material and a liquid (e.g., water and/or organic solvent) or that has been dried (e.g., hardened) by removal of a liquid. The coating layer is typically applied adjacent to a surface of a substrate.

The term "adjacent" can be used to refer to two materials that are in direct contact, and which can be in the form of layers, such as a coating (in liquid or dried (hardened) form) on a metal substrate, or a coating on a fibrous substrate.

The terms "comprise," "contain," "include," and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase and is limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether they materially affect the activity or action of the listed elements. Any of the elements or combinations of elements that are recited in this specification in open-ended language (e.g., comprise, include, contain, and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful and is not intended to exclude other claims from the scope of the disclosure.

In this application, terms such as "a," "an," and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or both. For example, the expression A and/or B means A alone, B alone, or both A and B.

Also, the recitations of numerical ranges by endpoints include all numbers subsumed within that range as well as the endpoints (e.g., 1 to 5 includes 1, 1.5, 2, 2.75, 3, 3.80, 4, 5, etc.) and any sub-ranges (e.g., 1 to 5 includes 1 to 4, 1 to 3, 2 to 4, etc.).

As used herein, the term "room temperature" refers to a temperature of 20° C. to 25° C. or 22° C. to 25° C.

The term "in the range" or "within a range" (and similar statements) includes the endpoints of the stated range.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION

Block copolymers having a first block (i.e., an A block) with pendant phosphoros-containing groups and having a second block (i.e., a B block) with pendant fluorinated groups are provided. Both blocks are derived from (meth)acryloyl-containing monomers (i.e., monomers that include (meth)acryloyl groups such as (meth)acrylates). For example, the block copolymer is a (meth)acrylate-based block copolymer.

The block copolymers described herein are preferably derived from a fluorinated monomer and a monomer that includes a phosphorus-containing group. The block copolymers can be applied to various surfaces such as metal-containing surfaces to provide a lower surface energy. The interpolymerized fluorinated monomers provide the surface modifying properties (e.g., low energy), while the phosphorus-containing group anchors the polymers disclosed herein to the substrate surface. Comparative Example 15 in the Examples Section, which includes a fluorinated homopolymer and no phosphorus-containing groups, demonstrates the need for the latter to anchor the copolymers to the substrate surface, as there is very little difference in peel forces between bare aluminum and treated aluminum.

The block copolymers described herein can be used to treat a metal-containing surface to provide a surface that has lower surface energy than the native metal-containing surface. The lower surface energy provides a surface that has a lower peel force, relative to the untreated metal-containing surface, for applied adhesive compositions making removal of the applied adhesive compositions easier. Surprisingly, the block copolymers of the present disclosure also provide a lower surface energy and, thus, a lower peel force, relative to the same surface treated with a random copolymer of the same monomers, for applied adhesive compositions, thereby making removal of the applied adhesive compositions easier. This is demonstrated by the data presented in Table 2 in the Examples Section. The lower values for the percent remaining peel force for the block copolymers relative to the random copolymers of the same monomers demonstrates an improvement in lowering peel force suggesting lower surface energies of the block copolymers relative to the random copolymers of the same monomers.

Block Copolymers

A block copolymer is provided that includes at least one A block and at least one B block. The block copolymer can have more than one A block and/or more than one B block. In many embodiments the block copolymer has two B blocks and one A block that is positioned between the two B blocks. That is, the block copolymer is a BAB triblock copolymer. The BAB block copolymers may be particularly effective for treatment of metal-containing surfaces because the A block in the center of the block copolymer has a phosphorus-containing group that can be attached to metal-containing surfaces. The two outer B blocks contain pendant fluorinated groups that can provide a lower surface energy.

Typically, most of the monomers used to form the block copolymer have a (meth)acryloyl group. For example, greater than 50 mole percent, greater than 60 mole percent, greater than 70 mole percent, greater than 80 mole percent, greater than 90 mole percent, greater than 95 mole percent, greater than 97 mole percent, greater than 98 mole percent, greater than 99 mole percent, or 100 mole percent of the monomers used to form the block copolymer have a (meth)acryloyl group. The monomers can be (meth)acrylates (i.e., (meth)acrylic acid esters), (meth)acrylamides, (meth)acrylic acids, and combinations thereof.

The monomeric units in the A block are derived from first monomers having both a (meth)acryloyl group and a phosphorus-containing group. In many embodiments, the first monomers are of Formula (I):

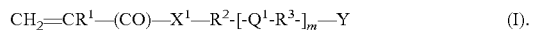

In Formula (I), $R^1$ is hydrogen or methyl and $X^1$ is oxy (—O—) or —NR$^4$—, wherein and $R^4$ is independently hydrogen or alkyl. Group $R^2$ is an alkylene or heteroalkylene and group $R^3$ is an alkylene. Group $Q^1$ is selected from —(CO)X$^2$— or —NR$^4$—(CO)—X$^2$— where each X$^2$ is independently oxy (—O—) or —NR$^4$— and $R^4$ is independently hydrogen or alkyl. The variable m is 0 or 1. Group Y is a phosphorus-containing group, such as those selected from a phosphonic acid, phosphonate, phosphonic acid ester, phosphoric acid, phosphate, or phosphoric acid ester. In certain embodiments, group Y is —P(O)(OH)$_2$. The group —(CO)—X$^1$—R$^2$-[-Q$^1$-R$^3$-]$_m$—Y can be considered as the pendant group of the first monomer.

When $R^1$ is hydrogen and $X^1$ is oxy, the monomer of Formula (I) is an acrylate. When $R^1$ is methyl and $X^1$ is oxy, the monomer is a methacrylate. When $R^1$ is hydrogen and $X^1$ is —NH—, the monomer is an acrylamide and when $R^1$ is methyl and $X^1$ is —NH—, the monomer is a methacrylamide.

Group $R^2$ is an alkylene or heteroalkylene. Suitable alkylene groups often have 1 to 20 carbon atoms, 1 to 10 carbon atoms, 1 to 6 carbon atoms, or 1 to 4 carbon atoms. Suitable heteroalkylene groups often contain one or more heteroatoms elected from oxygen (—O—) or nitrogen (—NH—). In some embodiments, the heteroalkylene contains 2 to 20 carbon atoms, 2 to 10 carbon atoms, 2 to 6 carbon atoms, or 2 to 4 carbon atoms and 1 to 5 heteroatoms, 1 to 4 heteroatoms, of 1 to 3 heteroatoms.

Group $Q^1$ is selected from —(CO)—X$^2$— or —NR$^4$—(CO)—X$^2$— where X$^2$ is oxy or —NR$^4$—. That is, $Q^1$ is —(CO)—O—, —(CO)—NR$^4$—, —NR$^4$—(CO)—NR$^4$—, or —NR$^4$—(CO)—O— where $R^4$ is hydrogen or alkyl. Suitable alkyl groups for $R^4$ often have 1 to 10 carbon atoms, 1 to 6 carbon atoms, or 1 to 4 carbon atoms. In some embodiments, $R^4$ is hydrogen or methyl. Group $R^4$ is often hydrogen.

Group $R^3$ is an alkylene. Suitable alkylene groups typically have 1 to 10 carbon atoms, 1 to 6 carbon atoms, or 1 to 4 carbon atoms.

Group Y is phosphorus-containing group. In certain embodiments, group Y is selected from a phosphonic acid, phosphonic acid ester, phosphonate, phosphoric acid, phosphoric acid ester, or phosphate. Any anionic group (e.g., phosphate or phosphonate) is charge balanced with a cationic group. In certain embodiments, group Y is —P(O)(OH)$_2$.

When m is equal to 0, the first monomer of Formula (I) is of Formula (I-A):

When m is equal to 1, the first monomer of Formula (I) is of Formula (I-B):

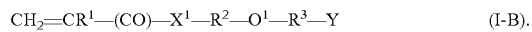

The groups $R^1$, $X^1$, $R^2$, $R^3$, and Y are the same as for Formula (I).

The first monomer of Formula (I-A) can be a (meth) acrylate of Formula (I-1) or a (meth)acrylamide of Formula (I-2):

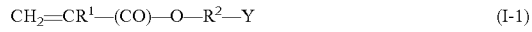

The groups $R^1$, $R^2$, and Y are the same as described above for monomers of Formula (I).

A preferred monomer of Formula (I-1) is $CH_2$=CH—(CO)—O—$CH_2CH_2$—P(O)(OH)$_2$.

The first monomers of Formula (I-A) having a phosphonic acid ester group can be prepared, for example, by reaction of (meth)acryloyl chloride with an equimolar amount of HX$^1$—R$^2$—PO(OR$^a$)$_2$ to form a first monomer of formula CH$_2$=CR$^1$—(CO)—X$^1$—R$^2$—PO(OR$^a$)$_2$. In this formula, Ra is a hydrogen, trimethylsilyl or an alkyl, $X^1$ is oxy or —NH—, and $R^2$ is alkylene or heteroalkylene. Suitable examples of compounds of formula HX$^1$—R$^2$—PO(OR$^a$)$_2$ include hydroxyethylphosphonate dimethyl ester, aminomethyl phosphonic acid, aminoethyl phosphonic acid, diethyl (2-aminoethyl)phosphonate, and aminoproyl phosphonic acid.

The first monomers of Formula (I-A) having a phosphonic acid group can be formed from the first monomer of formula CH$_2$=CR$^1$—(CO)—X$^1$—R$^2$—PO(OR$^a$)$_2$ having a phosphonic acid ester group. The phosphonic acid ester-containing monomer can be treated with bromotrimethylsilane to form an intermediate of formula $CH_2=CR^1—(CO)—X^1—R^2—PO(OSi(CH_3)_3)_2$ that is subsequently treated with an alcohol such as methanol to form the first monomer of formula $CH_2=CR^1—(CO)—O—R^2—PO(OH)_2$. Depending on the pH, the phosphonic acid group can become a phosphonate salt. For example, the phosphonic acid group can be treated with a base to be converted into a phosphonate salt.

First monomers of Formula (I-A) having a phosphoric acid ester group can be prepared, for example, by initially reacting (meth)acryloyl chloride with $HX^1—R^2—O—PO(OR^a)_2$ to form the first monomer of formula $CH_2=CR^1—(CO)—X^1—R^2—O—PO(OR^a)_2$. Suitable examples of compounds of formula $HX^1—R^2—O—PO(OR^a)_2$ include diethyl 2-hydroxyethyl phosphate.

The first monomers of Formula (I-A) having a phosphoric acid group can be formed from the first monomer of formula $CH_2=CR^1—(CO)—X^1—R^2—O—PO(OR^a)_2$ having a phosphoric acid ester group. The phosphoric acid ester-containing monomer can be treated with bromotrimethylsilane to form an intermediate of formula $CH_2=CR^1—(CO)—X^1—R^2—O—PO(OSi(CH_3)_3)_2$ that is subsequently treated with an alcohol such as methanol to form the first monomer of formula $CH_2=CR^1—(CO)—O—R^2—O—PO(OH)_2$. Depending on the pH, the phosphoric acid group can become a phosphate salt. For example, the phosphoric acid group can be treated with a base to be converted into a phosphate salt.

The first monomer of Formula (I-B) can be a (meth)acrylate of Formula (I-3) or a (meth)acrylamide of Formula (I-4):

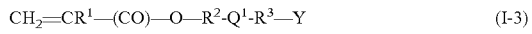

$$CH_2=CR^1—(CO)—O—R^2-Q^1-R^3—Y \quad (I-3)$$

$$CH_2=CR^1—(CO)—NH—R^2-Q^1-R^3—Y \quad (I-4).$$

The groups $R^1$, $R^2$, $Q^1$, $R^3$, and Y are the same as for Formula (I).

The $Q^1$ group in the first monomers of Formula (I-B) can be of formula $—(CO)—O—$, $—(CO)—NR^4—$, $—NR^4—(CO)—NR^4—$, or $—NR^4—(CO)—O—$ where $R^4$ is hydrogen or alkyl. Thus, the (meth)acrylate of Formula (I-3) can be of Formula (I-5) or (I-6):

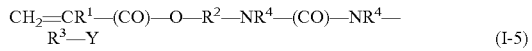

$$CH_2=CR^1—(CO)—O—R^2—NR^4—(CO)—NR^4—R^3—Y \quad (I-5)$$

$$CH_2=CR^1—(CO)—O—R^2—NR^4—(CO)—O—R^3—Y \quad (I-6).$$

Likewise, the (meth)acrylamide of Formula (I-4) can be of Formula (I-7) or (I-8):

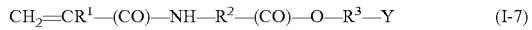

$$CH_2=CR^1—(CO)—NH—R^2—(CO)—O—R^3—Y \quad (I-7)$$

$$CH_2=CR^1—(CO)—NH—R^2—(CO)—NR^4—R^3—Y \quad (I-8).$$

Some specific example monomers of either Formula (I-5) or Formula (I-6) are of Formula (I-9):

$$CH_2=CR^1—(CO)—O—CH_2CH_2—NH—(CO)—X^2—R^3—Y \quad (I-9)$$

where $R^2$ is equal to $—CH_2CH_2—$ and $Q^1$ is equal to $—NH—(CO)—X^2—$. Group $X^2$ is oxy or $—NR^4—$ (e.g., $—NH—$). A preferred monomer of Formula (I-9) is $CH_2=CR^1—(CO)—O—CH_2CH_2—NH—(CO)—NH—CH_2CH_2—P(O)(OH)_2$.

Such monomers of Formula (I-9) can be prepared, for example, by reaction of 2-isocyanatoethyl (meth)acrylate with a compound of formula $HX^2—R^3—PO(OR^a)_2$ or $HX^2—R^3—O—PO(OR^a)_2$. Other isocyanatoalkyl (meth)acrylates can be used in place of 2-isocyanatoethyl (meth)acrylate to provide alternatives to $—CH_2CH_2—$ as the $R^2$ group. Examples of suitable compounds of formula $HX^2—R^3—PO(OR^a)_2$ include hydroxyethylphosphonate dimethyl ester, diethyl (2-aminoethyl)phosphonate, aminomethyl phosphonic acid, aminoethyl phosphonic acid, aminopropyl phosphonic acid. Suitable examples of compounds of formula $HX^2—R^3—O—PO(OR^a)_2$ include diethyl 2-hydroxyethyl phosphate. The resulting monomers are phosphonic acid ester-containing monomers of formula $CH_2=CR^1—(CO)—O—CH_2CH_2—NH—(CO)—X^2—R^3—PO(OR^a)_2$ or phosphoric acid ester-containing monomers of formula $CH_2=CR^1—(CO)—O—CH_2CH_2—NH—(CO)—X^2—R^3—O—PO(OR^a)_2$. Either of these monomers can be reacted with bromotrimethylsilane and then treated with an alcohol such as methanol to form phosphonic acid-containing monomers of formula $CH_2=CR^1—(CO)—O—CH_2CH_2—NH—(CO)—X^2—R^3—PO(OH)_2$ or phosphoric acid-containing monomers of formula $CH_2=CR^1—(CO)—O—CH_2CH_2—NH—(CO)—X^2—R^3—O—PO(OR^a)_2$.

Some specific example monomers of Formula (I-7) or (I-8) are of Formula (I-10) where $R^2$ is equal to $—C(CH_3)_2—$ and $Q^1$ is equal to $—(CO)—X^2—$ wherein $X^2$ is oxy or $—NR^4—$ (e.g., $—NH—$):

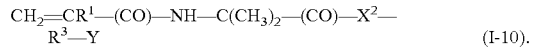

$$CH_2=CR^1—(CO)—NH—C(CH_3)_2—(CO)—X^2—R^3—Y \quad (I-10).$$

A preferred monomer of Formula (I-10) is $CH_2=CH—(CO)—NH—C(CH_3)_2—(CO)—NH—CH_2CH_2—P(O)(OH)_2$.

Such monomers of Formula (I-10) can be prepared by reaction of vinyl dimethyl azlactone (VDM) with a compound of formula $HX^2—R^3—PO(OR^a)_2$ or $HX^2—R^3—O—PO(OR^a)_2$. Examples of suitable compounds of formula $HX^2—R^3—PO(OR^a)_2$ and of formula $HX^2—R^3—O—PO(OR^a)_2$ are the same as described above. The resulting monomers are phosphonic acid ester-containing monomers of formula $CH_2=CR^1—(CO)—NH—C(CH_3)_2—(CO)—X^2—R^3—PO(OR^a)_2$ or phosphoric acid ester-containing monomers of formula $CH_2=CR^1—(CO)—NH—C(CH_3)_2—(CO)—X^2—R^3—O—PO(OR^a)_2$. Either of these monomers can be reacted with bromotrimethylsilane and then treated with an alcohol such as methanol to form a phosphonic acid-containing monomer or phosphoric acid-containing monomer of phosphonic acid-containing monomers of formula $CH_2=CR^1—(CO)—NH—C(CH_3)_2—(CO)—X^2—R^3—PO(OH)_2$ or phosphoric acid-containing monomers of formula $CH_2=CR^1—(CO)—NH—C(CH_3)_2—(CO)—X^2—R^3—O—PO(OH)_2$.

The monomeric units in the B block are derived from second (fluorinated) monomers having both a (meth)acryloyl group and a fluorinated group. The second monomers are selected from at least one of:

$C_nF_{(2n+1)}(CH_2)_zOC(=O)CR^5=CH_2$ (Formula (II)), wherein n is an integer selected from 1 to 6 (preferably, 1 to 4), z is an integer selected from 1 to 20 (preferably, 1 to 6), and $R^5$ is H or $CH_3$; or $C_pF_{(2p+1)}SO_2(NR^6)(CH_2)_qOC(=O)CR^7=CH_2$ (Formula (III)), wherein p is an integer selected from 1 to 6 (preferably, 1 to 4), q is an integer selected from 2 to 20 (preferably, 2 to 4), $R^6$ is H or C1-C8 alkyl group (preferably, a C1-C3 alkyl group), and $R^7$ is H or $CH_3$.

Exemplary fluorinated monomers (of Formulas (II) or (III)) include: $CF_3CF_2CF_2CH_2—O—C(=O)C(CH_3)=CH_2$; and $CF_3CF_2CF_2CF_2—S(=O)_2N(CH_3)CH_2CH_2—O—C(=O)C(CH_3)=CH_2$.

Any suitable method can be used to form the block copolymers, which are usually BAB block copolymers. In many embodiments, the block copolymers are formed using a photoinitiator with two terminal dithiocarbamate or dithiocarbonate groups. Such photoinitiators allow for controlled growth of each polymeric block to the desired weight average molecular weight. Suitable photoinitiators can be of Formula (IV):

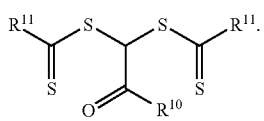

In Formula (IV), the group $R^{10}$ is an alkyl, alkoxy, or group of formula —N($R^{12}$)$_2$ where each $R^{12}$ is an alkyl. Group $R^{11}$ is an alkoxy or a group of formula —N($R^{13}$)$_2$ where each $R^{13}$ is an alkyl.

Suitable alkyl groups for $R^{10}$, $R^{12}$, and $R^{13}$ and suitable alkoxy groups for $R^{10}$ and $R^{11}$ often have 1 to 20 carbon atoms. These groups often have at least 1 carbon atoms, at least 2 carbon atoms, at least 3 carbon atoms, or at least 4 carbon atoms and up to 20 carbon atoms, up to 16 carbon atoms, up to 12 carbon atoms, up to 10 carbon atoms, up to 6 carbon atoms, or up to 4 carbon atoms. In many embodiments, alkyl groups for $R^{10}$, $R^{12}$, and $R^{13}$ and the alkoxy groups for $R^{10}$ and $R^{11}$ have 1 to 10 carbon atoms, 1 to 6 carbon atoms, or 1 to 4 carbon atoms.

The photoinitiators of Formula (IV) can be prepared as described in International Publication Nos. WO 2018/013330 (Griesgraber et al.) and WO2019/123124 (Lewandowski et al.). Specific examples of the photoinitiators include, but are not limited to, 1,1-bis(isopropoxycarbothioyl sulfanyl)-2-propanone, 1,1-bis (diethylcarbamothioyl sulfanyl)-2-propanone, methyl 2,2-bis(diethylcarbamothiolysulfanyl)acetate, methyl 2,2-bis(isopropoxycarbothiolysulfanyl)acetate, 2-ethylhexyl 2,2-bis(diethylcarbamothiolysulfanyl)acetate, 2-ethylhexyl 2,2-bis(isopropoxycarbothiolysulfanyl)acetate, octyl 2,2-bis(diethylcarbamothiolysulfanyl)acetate, tert-butyl 2,2-bis(isopropoxycarbothiolysulfanypacetate, and N,N-dibutyl-2,2-bis(isopropoxycarbothiolysulfanyl)acetate.

When exposed to ultraviolet radiation in the presence of monomers having (meth)acryloyl groups, the photoinitiators of Formula (IV) form two radicals as shown in the following reaction.

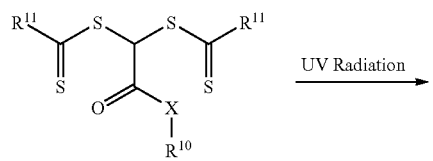

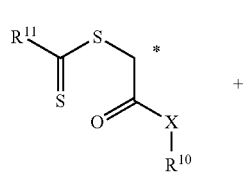

The radical of Formula (V) can react with the monomers forming a new radical of a progressively larger molecular weight with the reaction of each additional monomer. The radical of Formula (VI) can terminate the polymerization process but the resulting polymeric product can undergo photolysis with the formation of two radicals in the presence of ultraviolet radiation. One of these radicals is *S—(C=S)—$R^{11}$ and the other is a polymeric radical. The polymeric radical can react further with monomers that are present. The polymeric material will continue to grow in this manner in the presence of available monomers and ultraviolet radiation. No growth of the polymeric material can occur when exposure to ultraviolet radiation is terminated.

Typically, the A block is formed first. The first monomer of Formula (I) is combined with the photoinitiator of Formula (IV) to form a first reaction mixture. When exposed to ultraviolet radiation, photolysis of the photoinitiator and controlled radical polymerization of the first monomer occurs. A first polymeric material forms that contains the A block. The structure of the first polymeric material is shown in Formula (VII):

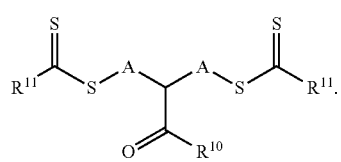

Polymeric material resulting from polymerization of the first reaction mixture can form on either side of the pendant —CH—(CO)—$R^{10}$ group and the length of polymeric chain formed on either may be the same or different. The polymeric material on either side of the pendant group that is formed from the first reaction mixture is represented by A. The entire structure between the two —S—(CS)—$R^{11}$ groups is considered a single A block. That is, polymer block A includes the pendant group —CH—(CO)—$R^{10}$.

Often, the only monomer in the first reaction mixture is the first monomer of Formula (I). That is, the A block is a homopolymer of the first monomer of Formula (I).

The second monomer can be added to the first polymeric material of Formula (VII) to form a second reaction mixture. Upon exposure to ultraviolet radiation, photolysis occurs again releasing the radical *S—(CS)—$R^{11}$. The second monomer can be polymerized to form a second block at both ends of the first polymeric material. The length of the polymeric chains formed at each end may be the same or different. When exposure to ultraviolet radiation ceases, the polymerization reaction terminates. The structure of the second polymeric material is shown in Formula (VIII) where each B is the polymeric chain formed from the second reaction mixture:

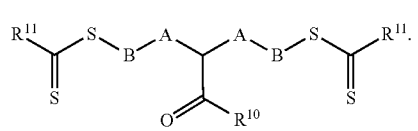

Formula (VIII) shows the structure for a BAB block copolymer, wherein R10 and R11 are described above.

In Formula (VIII), each A is a first polymeric block that is a polymerized product of a first polymerizable composition comprising first monomers of Formula (I):

$$CH_2=CR^1-(CO)-X^1-R^2-[-Q^1-R^3-]_m-Y \qquad (I)$$

Each B is a second polymeric block that is a polymerized product of a second polymerizable composition comprising monomers of Formula (II) and/or (III).

In Formulas (I), group $R^1$ is hydrogen or methyl, group $X^1$ is oxy or $-NR^4-$, group $R^2$ is an alkylene or heteroalkylene, group $R^3$ is an alkylene, group $Q^1$ is $-(CO)X^2-$ or $-NR^4-(CO)-X^2-$, group $X^2$ is oxy or $-NR^4-$, group $R^4$ is hydrogen or alkyl, the variable m is equal to 0 or 1, and group Y is a phosphorus-containing group. In certain embodiments, group Y is $-P(O)(OH)_2$.

It is often desirable to polymerize at least 85 mole percent of the first monomer prior to addition of the second monomer. In some embodiments, at least 90 mole percent, at least 95 mole percent, at least 97 mole percent, at least 98 mole percent, or at least 99 mole percent of the first monomer is reacted prior to addition of the second monomer. The higher the extent of reaction of the first monomer, the sharper the transition between the first block (A block) and the second blocks (B blocks).

Often, the only monomers in the second reaction mixture is the second monomer of Formulas (II) and/or (III) plus any remaining unreacted first monomer of Formula (I). If the first monomers are essentially polymerized prior to formation of the B block, the B block is a homopolymer of the second monomer of Formula (II). Other monomers may be added if desired such as, for example, various monomers that can be used to alter the surface energy of the B block when the block copolymer is used as a coating on a surface.

The block copolymer often contains 1 to 30 weight percent A block and 70 to 99 weight percent B block, based on a total weight of the block copolymer. If there is less than 1 weight percent of the A block, a coating of the block copolymer may not adhere sufficiently to a surface such as a metal-containing surface. If there is more than 30 weight percent of the A block copolymer, however, the amount of the fluorochemical ends may not be sufficient to provide reduced surface energy. The amount of the A block is often at least 1 weight percent, at least 2 weight percent, at least 5 weight percent, at least 10 weight percent, and often up to 30 weight percent, up to 25 weight percent, up to 20 weight percent, or up to 15 weight percent, based on the total weight of the block copolymer. The balance of the block copolymer is usually the B block. For example, the block copolymer can be 5 to 30 weight percent A block and 70 to 95 weight percent B block, 10 to 30 weight percent A block and 70 to 90 weight percent B block, 10 to 25 weight percent A block and 75 to 90 weight percent B block, or 10 to 20 weight percent A block and 80 to 90 weight percent B block. The weight percent values are based on a total weight of the block copolymer.

The block copolymer often has a weight average molecular weight (Mw) in a range of 5,000 to 200,000 Daltons. The weight average molecular weight is often at least 5,000 Daltons, at least 10,000 Daltons, at least 20,000 Daltons, at least 30,000 Daltons, or at least 50,000 Daltons, and can be up to 200,000 Daltons, up to 150,000 Daltons, up to 100,000 Daltons, or up to 50,000 Daltons.

Coating Compositions

The copolymers of the present disclosure may be applied directly to the surface, for example, by extrusion of a molten polymer, or applied out of a solvent onto the substrate surface.

Thus, in one aspect of the disclosure, a coating composition is provided that includes the block copolymer described herein plus an organic solvent. The block copolymer is dissolved or dispersed in the organic solvent to reduce the viscosity generating a flowable composition.

The solvent(s) used typically include those that are substantially inert (i.e., substantially nonreactive with the copolymers of the present disclosure) and capable of dispersing or dissolving the copolymers. The solvent may be the same solvent used for the polymerization. Exemplary solvents include non-fluorinated solvents, fluorinated solvents, and combinations thereof.

Exemplary non-fluorinated solvents include alcohols such as isopropyl alcohol, ketones such as methylisobutyl ketone, and propylene glycol ethers such as PGMEA (propyleneglycol methyl ether acetate), ethylene glycol ethers such as ethylene glycol dimethyl ether, alkyl ester solvents such as ethyl or butyl acetate, and ethers such as tetrahydrofuran.

Exemplary fluorinated solvents include trifluoroethanol and hydrofluoroethers. Suitable hydrofluoroethers can be represented by the following general Formula (IX):

$$R_f^1-[OR_h]_a \qquad (IX)$$

where a is an integer of 1 to 3, $R_f^1$ is a monovalent, divalent, or trivalent radical of a perfluoroalkane, perfluoroether, or perfluoropolyether that is linear, branched, cyclic, or combinations thereof; and $R_h$, an alkyl or heteroalkyl group that is linear, branched, cyclic, or combinations thereof. For example, the hydrofluoroether can be methyl perfluorobutyl ether or ethyl perfluorobutyl ether. Exemplary hydrofluoroethers include those available under the trade designations "3M NOVEC 7000 ENGINEERED FLUID," "3M NOVEC 7100 ENGINEERED FLUID," "3M NOVEC 7200 ENGINEERED FLUID," "3M NOVEC 7300 ENGINEERED FLUID," "3M NOVEC 7500 ENGINEERED FLUID," and "3M NOVEC 7600 ENGINEERED FLUID" from 3M Co., St. Paul, MN.

In certain embodiments, the block copolymer is present in an amount of at least 0.01 weight percent, at least 0.1, or at least 1 weight percent, based on a total weight of the coating composition. In certain embodiments, the block copolymer is present in an amount of up to 10 weight percent, up to 5 weight percent, up to 2 weight percent, or up to 1 weight percent, based on the total weight of the coating composition.

Articles

In another aspect of the disclosure, an article is provided that includes a substrate and a coating layer positioned adjacent to the substrate, wherein the coating layer includes a block copolymer as described herein. The coating layer is a hardened (e.g., dried) coating layer that is usually formed by application of the coating composition as described herein to the surface of the substrate.

The substrate may be a metal-containing substrate or a flexible fibrous substrate. As used herein, the term "metal-containing" can refer to elemental metals or alloys of metals. The term also includes surface oxides of such elemental metal or alloy. The metal is typically a solid at room temperature. Exemplary metal and/or metal alloys include chromium, aluminum, copper, nickel, (e.g., stainless) steel, titanium, silver, and alloys and mixtures thereof. The copolymers of the present disclosure may be applied to the native oxide surface layer of the metal (e.g., metal oxides and mixed metal oxides and nitrides including alumina, titania, titanium nitride, and indium tin oxide) or the surface of the substrate may be cleaned (e.g., abrading, washing, etc.) prior to contact with the polymers of the present disclosure.

Typically, the copolymers of the present disclosure are applied as a layer to at least a portion, desirably all, of the substrate surface to be treated. Desirably, the copolymer coats the surface of the substrate.

Because the copolymers of the present disclosure are copolymeric in nature, they may provide more robustness to the coating layer. In other words, the coating layers comprising the copolymers of the present disclosure may provide corrosion protection to the underlying metal-containing substrate.

The layer of copolymer on the substrate surface may be of any thickness, with typical dried thicknesses in the range of at least 5 nanometers (nm), at least 10 nm, at least 15 nm, at least 20 nm, at least 50 nm, at least 100 nm, or at least 200 nm, and often up to 500 nm.

The thickness of the layer may be dependent, for example, on the percent solids of the coating composition and/or the number of layers applied. Advantageously, because of their copolymeric nature, single coating applications could be used and still achieve effective coating layers, making the coating process simpler and/or less expensive. The thickness of the layer of copolymer on the substrate surface can depend on the application, with thicker coating layers preferred in corrosive environments.

Advantageously, it is believed that the copolymers of the present disclosure will change the surface properties of the underlying substrate in a surface, which has among other things, low peel force, and/or large contact angles. In one embodiment, the copolymer provides additional protection to the underlying substrate from sprayed/aerosolized particles or noxious gases which may be corrosive. For example, the copolymers of the present disclosure may be coated for use in appliances and in automotive, manufacturing, and medical applications.

Methods

In one embodiment, the block copolymer of the present disclosure is applied directly to the surface of a metal-containing substrate. This may be carried out, for example, by extrusion of the molten copolymer or applying plugs of the dried copolymer onto the substrate surface and then applying heat (for example, at temperatures which allow the copolymer to flow, e.g., 140° C.). Alternatively, the copolymer may be buffed onto the substrate surface.

In another embodiment, the copolymer is applied out of a coating composition that also includes an organic solvent onto the substrate surface. The coating composition (e.g., solution or dispersion) may be applied onto the substrate via spray coating, dip coating, wiping, bushing, rolling, knife coating, die-coating, injecting (via a syringe), or other coating techniques known in the art.

The metal-containing surface may also be cleaned. For cleaning such a surface, contaminants may be removed using any conventional method, such as wiping or scrubbing.

Thus, in another aspect of the present disclosure, a method of coating a substrate is provided. The method includes providing a block copolymer as described herein, which, in certain embodiments, may be in the form of a coating composition that also includes an organic solvent in which the block copolymer may be dissolved or dispersed. The method further includes applying the copolymer to the substrate.

After the copolymer (e.g., coating composition or neat copolymer) is applied to the substrate surface, the coating may be subsequently dried (air dried or with heat) or hardened to form a dried (or hardened) coating layer that is adjacent to the substrate. Optionally, heat (or other form of radiation) can be used, e.g., about up to 105-110° C. for at least 5 minutes to remove any residual solvent and/or enhance the bonding of the copolymer to the substrate.

In certain embodiments, the method of coating is a method of treating a surface. That is, if there is a hardened (e.g., dried) coating of the block copolymer on the substrate, the substrate (e.g., substrate surface) is treated to provide a lower surface energy. Thus, the treated surface has lower peel force for applied adhesive compositions making removal of the applied adhesive compositions easier. The treated surface may also have improved chemical/corrosion resistance compared to the untreated metal-containing surface. The treated surface may also have a more robust surface (e.g., more resistant to abrasion) compared to the untreated metal-containing surface. The treated surface may also have a surface more resistant to graffiti (i.e., a mark made on a surface using paint, ink, or other fluids carrying dyes, pigments, or other colorants) compared to the untreated metal-containing surface.

EMBODIMENTS

Various embodiments are provided that include a block copolymer, a coating composition, an article, and a method of coating a substrate.

Embodiment 1A is a block copolymer. The block copolymer contains at least one A block and at least one B block. The A block contains multiple monomeric units derived from a first monomer comprising a (meth)acryloyl group and a phosphorus-containing group. The B block contains multiple monomer units derived from a second monomer comprising a (meth)acryloyl group and a fluorinated group. At least one B block comprises multiple monomeric units derived from a second monomer selected from at least one of: $C_nF_{(2n+1)}(CH_2)_zOC(=O)CR^5=CH_2$ (Formula (II)), wherein n is an integer selected from 1 to 6, z is an integer selected from 1 to 20, and $R^5$ is H or $CH_3$; or $C_pF_{(2p+1)}SO_2(NR^6)(CH_2)_qOC(=O)CR^7=CH_2$ (Formula (III)), wherein p is an integer selected from 1 to 6, q is an integer selected from 2 to 20, $R^6$ is H or C1-C8 alkyl group, and $R^7$ is H or $CH_3$.

Embodiment 2A is the block copolymer of embodiment 1A, wherein the block copolymer is a triblock copolymer having two B blocks and one A block.

Embodiment 3A is the block copolymer of embodiment 1A or 2A, wherein the first monomer is of Formula (I);

$$CH_2=CR^1-(CO)-X^1-R^2-[-Q^1-R^3-]_m-Y \qquad (I).$$

In Formula (I), group $R^1$ is hydrogen or methyl, group $X^1$ is oxy or $-NR^4-$, group $R^2$ is an alkylene or heteroalkylene, group $R^3$ is an alkylene, group $Q^1$ is $-(CO)X^2-$, $-NR^4-(CO)-X^2-$, group $X^2$ is oxy or $-NR^4-$, group $R^4$ is hydrogen or alkyl, variable m is 0 or 1, and group Y is a phosphorus-containing group. In certain embodiments, group Y is $-P(O)(OH)_2$.

Embodiment 4A is the block copolymer of Embodiment 3A, wherein the first monomer of Formula (I) is of Formula (I-A) or (I-B):

$$CH_2=CR^1-(CO)-X^1-R^2-Y \qquad (I-A)$$

$$CH_2=CR^1-(CO)-X^1-R^2-Q^1-R^3-Y \qquad (I-B).$$

Embodiment 5A is the block copolymer of Embodiment 4A, wherein the first monomer of Formula (I-A) is of Formula (I-1) or Formula (I-2):

$$CH_2=CR^1-(CO)-O-R^2-Y \qquad (I-1)$$

$$CH_2=CR^1-(CO)-NH-R^2-Y \qquad (I-2).$$

A preferred embodiment includes a first monomer of Formula (I-A), wherein m=0. A preferred embodiment of Formula (I-A) is of Formula (I-1), an example of which is $CH_2=CH-(CO)-O-CH_2CH_2-P(O)(OH)_2$.

Embodiment 6A is the block copolymer of embodiment 4A, wherein the first monomer of Formula (I-B) is of Formula (I-3) or (I-4):

$$CH_2=CR^1-(CO)-O-R^2-Q^1-R^3-Y \qquad (I\text{-}3)$$

$$CH_2=CR^1-(CO)-NH-R^2-Q^1-R^3-Y \qquad (I\text{-}4).$$

Embodiment 7A is the block copolymer of embodiment 6A, wherein the first monomer of Formula (I-3) is of Formula (I-5) or (I-6):

$$CH_2=CR^1-(CO)-O-R^2-NR^4-(CO)-NR^4-R^3-Y \qquad (I\text{-}5)$$

$$CH_2=CR^1-(CO)-O-R^2-NR^4-(CO)-O-R^3-Y \qquad (I\text{-}6).$$

Embodiment 8A is the block copolymer of embodiment 6A, wherein the first monomer of Formula (I-4) can be of Formula (I-7) or (I-8):

$$CH_2=CR^1-(CO)-NH-R^2-(CO)-O-R^3-Y \qquad (I\text{-}7)$$

$$CH_2=CR^1-(CO)-NH-R^2-(CO)-NR^4-R^3-Y \qquad (I\text{-}8).$$

Embodiment 9A is the block copolymer of embodiment 7A, wherein the first monomer of Formula (I-5) or (I-6) is of Formula (I-9):

$$CH_2=CR^1-(CO)-O-CH_2CH_2-NH-(CO)-X^2-R^3-Y \qquad (I\text{-}9).$$

Embodiment 10A is the block copolymer of embodiment 8A, wherein the first monomer of Formula (I-7) or (I-8) is of Formula (I-10):

$$CH_2=CR^1-(CO)-NH-C(CH_3)_2-(CO)-X^2-R^3-Y \qquad (I\text{-}10).$$

Another preferred embodiment includes a first monomer of Formula (I-B), wherein m=1. A preferred embodiment of Formula (I-B) is of Formula (I-10), an example of which is $CH_2=CH-(CO)-NH-C(CH_3)_2-(CO)-NH-CH_2CH_2-P(O)(OH)_2$. Another preferred embodiment of Formula (I-B) is of Formula (I-9), an example of which is $CH_2=CR^1-(CO)-O-CH_2CH_2-NH-(CO)-NH-CH_2CH_2-P(O)(OH)_2$.

Embodiment 11A is the block copolymer of any one of the previous embodiments, wherein the second monomer is of Formula (II).

Embodiment 12A is the block copolymer of embodiment 11A, wherein the second monomer is of Formula (II) wherein n is an integer selected from 1 to 6, z is an integer selected from 1 to 6, and $R^5$ is H or $CH_3$.

Embodiment 13A is the block copolymer of any one of the previous embodiments, wherein the second monomer is of Formula (III).

Embodiment 14A is the block copolymer of claim 13A, wherein the second monomer is of Formula (III), wherein p is an integer selected from 1 to 6, q is an integer selected from 2 to 4, $R^6$ is H or C1-C3 alkyl group, and $R^7$ is H or $CH_3$.

Embodiment 15A is the block copolymer of any one of the previous embodiments, wherein the second monomer is selected from:

$$CF_3CF_2CF_2CH_2-O-C(=O)C(CH_3)=CH_2; \text{ and}$$

$$CF_3CF_2CF_2CF_2-S(=O)_2N(CH_3)CH_2CH_2-O-C(=O)C(CH_3)=CH_2.$$

Embodiment 16A is the block copolymer of any one of the previous embodiments, wherein the block copolymer comprises 1 to 30 weight percent A block and 70 to 99 weight percent B block based on a total weight of the block copolymer.

Embodiment 17A is the block copolymer of any one of the previous embodiments, wherein the block copolymer is of Formula (VIII):

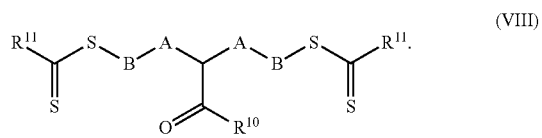

wherein: $R^{16}$ is an alkyl, alkoxy, or group of formula $-N(R^{12})_2$; $R^{11}$ is an alkoxy or a group of formula $-N(R^{13})_2$; and each $R^{13}$ is an alkyl. In Formula (VIII), each A is a first polymeric block that is a polymerized product of a first polymerizable composition comprising first monomers of Formula (I):

$$CH_2=CR^1-(CO)-X^1-R^2-[-Q^1-R^3-]_m-Y \qquad (I).$$

Each B is a second polymeric block that is a polymerized product of a second polymerizable composition comprising monomers of Formula (II) and/or (III).

In Formulas (I), group $R^1$ is hydrogen or methyl, group $X^1$ is oxy or $-NR^4-$, group $R^2$ is an alkylene or heteroalkylene, group $R^3$ is an alkylene, group $Q^1$ is $-(CO)X^2-$ or $-NR^4-(CO)-X^2-$, group $X^2$ is oxy or $-NR^4-$, group $R^4$ is hydrogen or alkyl, the variable m is equal to 0 or 1, and group Y is a phosphorus-containing group. In certain embodiments, group Y is $-P(O)(OH)_2$.

Embodiment 18A is the block copolymer of any one of the previous embodiments, wherein the A block is a homopolymer of the first monomer.

Embodiment 19A is the block copolymer of any one of the previous embodiments, wherein the B block is a homopolymer of the second monomer.

Embodiment 20A is the block copolymer of any one of the previous embodiments which has a weight average molecular weight of at least 5,000 Daltons, at least 10,000 Daltons, at least 20,000 Daltons, at least 30,000 Daltons, or at least 50,000 Daltons.

Embodiment 21A is the block copolymer of any one of the previous embodiments which has a weight average molecular weight of up to 200,000 Daltons, up to 150,000 Daltons, up to 100,000 Daltons, or up to 50,000 Daltons.

Embodiment 1B is a coating composition that include a) an organic solvent and b) a block copolymer. The block copolymer is dissolved or dispersed in the organic solvent. The block copolymer is the same as described in embodiment 1A.

Embodiment 2B is the coating composition of embodiment 1B, wherein the block copolymer is according to any one of embodiments 2A to 21A.

Embodiment 3B is the coating composition of embodiment 1B or 2B, wherein the coating composition comprises 0.01 to 10 weight percent of the block copolymer based on a total weight of the coating composition.

Embodiment 1C is an article that includes a) a substrate and b) a coating layer positioned adjacent to the substrate, wherein the coating comprises a block copolymer of embodiment 1A.

Embodiment 2C is an article of embodiment 1C, wherein the coating comprises a block copolymer of any one of embodiments 2A to 21A.

Embodiment 3C is the article of embodiment 1C or 2C, wherein the substrate comprises a metal-containing surface.

Embodiment 4C is the article of embodiment 1C or 2C, wherein the substrate is a flexible fibrous substrate.

Embodiment 1D is a method of coating a substrate. The method includes providing a copolymer, which may be in the form of a coating composition as described in Embodiment 1B. The method further includes applying the copolymer, which may be in the form of a coating composition, to the substrate. The method still further includes drying (or hardening) the copolymer, which may be in the form of a coating composition, to form a dried (or hardened) coating layer that is adjacent to the substrate.

Embodiment 2D is the method of embodiment 1D, wherein the coating is of embodiment 2B or 3B.

Embodiment 3D is the method of embodiment 1D or 2D, wherein the substrate comprises a metal-containing surface.

EXAMPLES

Monomer A. 2-(Dimethoxyphosphoryl)ethyl Acrylate

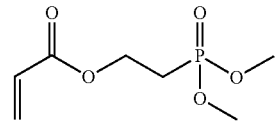

A 250 mL round bottom flask was charged with dimethyl hydroxyethylphosphonate dimethyl ester (6.29 g, 40.8 mmol), 60 mL of anhydrous dichloromethane and 50 mg of DMAP. The reaction mixture was cooled to 0° C. under an atmosphere of nitrogen followed by addition of triethylamine (4.20 g, 41.6 mmol). Acryloyl chloride (3.63 g, 40.1 mmol) was then added to the stirred solution over 5 minutes. The reaction mixture was warmed to ambient temperature overnight. The reaction mixture was then quenched by addition of a saturated $NaHCO_3$ solution and stirred for 15 minutes. The layers were separated and the aqueous layer

TABLE 1

| Materials | |
|---|---|
| Description (Abbreviation) | Source |
| Hydroxyethylphosphonate dimethyl ester (CAS# 54731-72-5) | TCI America., Portland, OR |
| 4-Dimethylaminopyridine (DMAP) | Alfa Aesar, Ward Hill, MA |
| Triethylamine (TEA) | EMD, Burlington, MA |
| Acryloyl chloride | Sigma-Aldrich Corporation, St. Louis, MO |
| Diethyl vinylphosphonate (CAS# 682-30-4) | Sigma-Aldrich Corporation, St. Louis, MO |
| Ammonium hydroxide (28-30%) | EMD, Burlington, MA |
| 2-Isocyanatoethyl methacrylate (IEM) (CAS# 30674-80-7) | Showa Denko, Tokyo, Japan |
| 4,4-Dimethyl-2-vinyl-4H-oxazol-5-one (vinyldimethylazlactone, VDM) (CAS# 29513-26-6) | SNPE, Inc, Princeton, NJ |
| Methyl 2,2-bis(isopropoxycarbothioylsulfanyl)acetate | Prepared as described in Photoinitiator Example 2 of WO 2018/013330 |
| 2,2,3,3,4,4,4-Heptafluorobutyl methacrylate (FBMA) (CAS# 13695-31-3) | Available from Sigma-Aldrich Chemical, St. Louis, MO |
| $C_4F_9S(=O)_2N(Me)CH_2CH_2OC(=O)CH=CH_2$ (MeFBSEMA) | preparation described in U.S. Pat. No. 7,662,896, Example 2 |
| Trifluoroethanol | Oakwood Chemical, Estill, SC |
| NOVEC 7100 | $C_4F_9OCH_3$, available from 3M Co., St. Paul, MN under the trade designation "3M NOVEC 7100 ENGINEERED FLUID" |
| NOVEC 7200 | $C_4F_9OC_2H_5$, available from 3M Co., St. Paul, MN under the trade designation "3M NOVEC 7200 ENGINEERED FLUID" |
| Bromotrimethylsilane (TMSBr) | Alfa Aesar, Ward Hill, MA |
| 2,6-Di-tert-butyl-4-methyl-phenol (BHT) | Sigma-Aldrich Chemical, St. Louis, MO | was extracted with an additional 20 mL of dichloromethane. The combined organic layers were washed sequentially with aqueous 5% NaH$_2$PO$_4$ solution, water and brine. The organic layer was dried over Na$_2$SO$_4$ and filtered. The solution was treated with 5 mg of BHT and then concentrated under reduced pressure to give 6.74 g of a yellow oil. $^1$H NMR (500 MHz, CHLOROFORM-d) δ 6.44 (dd, J=1.3, 17.3 Hz, 1H), 6.13 (dd, J=10.4, 17.3 Hz, 1H), 5.87 (dd, J=1.3, 10.4 Hz, 1H), 4.40 (td, J=7.4, 13.0 Hz, 2H), 3.77 (d, J=11.0 Hz, 6H), 2.23 (td, J=7.4, 18.8 Hz, 2H). $^{31}$P NMR (202 MHz, CHLOROFORM-d) δ 29.6.

Monomer B. Diethyl (2-(2-acrylamido-2-methylpropanamido)ethyl)phosphonate

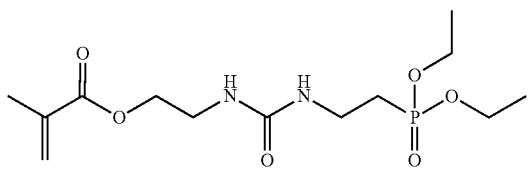 [SMILES: C=C(C)C(=O)OCCNC(=O)NCCP(=O)(OCC)OCC]

Part A

A 350 mL pressure flask was charged with 0.95 g of diethyl vinylphosphonate and 90 mL of concentrated aqueous ammonium hydroxide solution. The flask was sealed and allowed to stir for 3 days. The reaction mixture was then concentrated under reduced pressure to give 1.00 g of diethyl (2-aminoethyl)phosphonate as a colorless oil. $^1$H NMR (500 MHz, CHLOROFORM-d) δ 4.02-4.19 (m, 4H), 3.02 (td, J=7.1, 16.5 Hz, 2H), 1.96 (td, J=7.0, 18.0 Hz, 2H), 1.34 (t, J=7.1, 6H). $^{31}$P NMR (202 MHz, CHLOROFORM-d) δ 30.3.

Part B

A solution of diethyl (2-aminoethyl)phosphonate (1.00 g, 5.52 mmol) dissolved in 10 mL of dichloromethane was treated with VDM (767 mg, 5.51 mmol). After stirring overnight, the reaction mixture was concentrated under reduced pressure. Purification by column chromatography (SiO$_2$, 1%-10% MeOH/CHCl$_3$) gave 1.24 g of the desired product as a white solid. $^1$H NMR (500 MHz, CHLOROFORM-d) δ 7.35 (t, J=5.5 Hz, 1H), 7.06 (s, 1H), 6.26 (dd, J=2.1, 17.0 Hz, 1H), 6.19 (dd, J=9.7, 17.0 Hz, 1H), 5.62 (dd, J=2.1, 9.7 Hz, 1H), 4.00-4.21 (m, 4H), 3.54 (qd, J=6.4, 19.1 Hz, 2H), 1.99 (td, J=6.7, 17.5 Hz, 2H), 1.58 (s, 6H), 1.33 (t, J=7.1 Hz, 6H). $^{31}$P NMR (202 MHz, CHLOROFORM-d) δ 29.9.

Monomer C. Diethyl (2-(2-acrylamido-2-methylpropanamido)ethyl)phosphonate

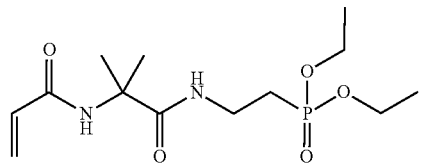 [SMILES: C=CC(=O)NC(C)(C)C(=O)NCCP(=O)(OCC)OCC]

A solution of diethyl (2-aminoethyl)phosphonate (1.12 g, 6.19 mmol) dissolved in 20 mL of dichloromethane was cooled in an ice bath and treated with 2-isocyanatoethyl methacrylate (960 mg, 6.19 mmol). After stirring overnight, the reaction mixture was concentrated under reduced pressure. Purification by column chromatography (SiO$_2$, 1%-5% MeOH/CHCl$_3$) gave 1.24 g of the desired product as a colorless syrup. $^1$H NMR (500 MHz, CHLOROFORM-d) δ 6.12 (s, 1H), 5.68 (br m, 1H), 5.53-5.61 (br m, 1H), 5.38 (br m, 1H), 4.20 (t, J=5.5 Hz, 2H), 3.99-4.14 (m, 4H), 3.42-3.54 (m, 6H), 2.00 (td, J=6.5, 17.2 Hz, 2H), 1.94 (s, 3H), 1.33 (t, J=7.1 Hz, 6H). $^{31}$P NMR (202 MHz, CHLOROFORM-d) δ 29.9.

Example 1. Synthesis of BAB Block Copolymer of Monomer A and FBMA

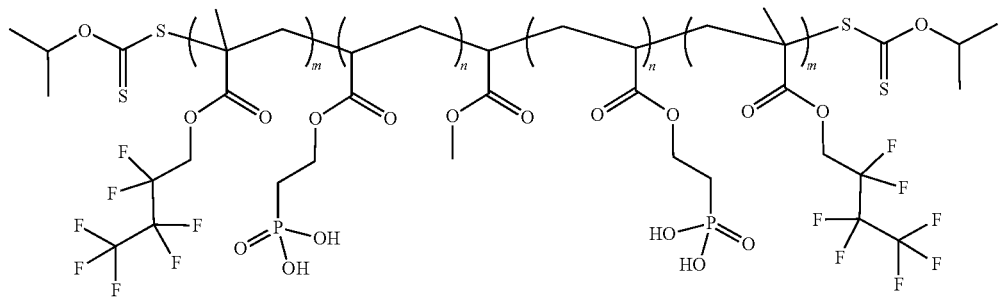

Monomer A (0.5 g, 2.4 mmol), methyl 2,2-bis(isopropoxycarbothioylsulfanyl) acetate (86 mg, 0.25 mmol) and 1 mL of ethyl acetate were added to a glass vial. The solution was purged with a stream of nitrogen for 10 minutes. The vial was sealed and placed on a bottle roller set at 30 revolutions per minute (rpm). Ultraviolet (UV)-initiated polymerization was conducted by irradiating the vial using a UV Benchtop lamp (UVP Blak Ray XX-15L, from Analytik Jena US, Beverly, MA) equipped with 2 bulbs (365 nm, 15 W) that was placed about 3 inches from the vial. The polymerization reaction was exposed to the UV radiation for about 18 hours. The glass vial was removed from the roller and FBMA (5.0 g, 18.7 mmol) and 4.6 mL of ethyl acetate were then added to the vial. The solution was purged with a stream of nitrogen for 10 minutes. The vial was sealed and returned to the roller and exposed to UV irradiation for approximately 18 hours. The reaction mixture was then treated with an additional 1.7 g of FBMA (6.3 mmol) and 1 mL of NOVEC 7100 to make the mixture homogenous. The solution was purged with a stream of nitrogen for 10 minutes. The vial was sealed and returned to the roller and exposed to UV irradiation for approximately 18 hours. The mixture was then concentrated under reduced pressure to give 6.0 g of a crusty white solid.

A 2.0 g sample of the white solid was dissolved in 10 mL of anhydrous $CH_2Cl_2$ under an atmosphere of nitrogen. TMSBr (0.35 mL) was added and the mixture was stirred overnight. The reaction mixture was concentrated under reduced pressure and then concentrated from methanol to give the title block copolymer as a light-yellow solid. NMR analysis showed complete deprotection of the phosphonate esters.

Example 2. Synthesis of BAB Block Copolymer of Monomer A and MeFBSEMA

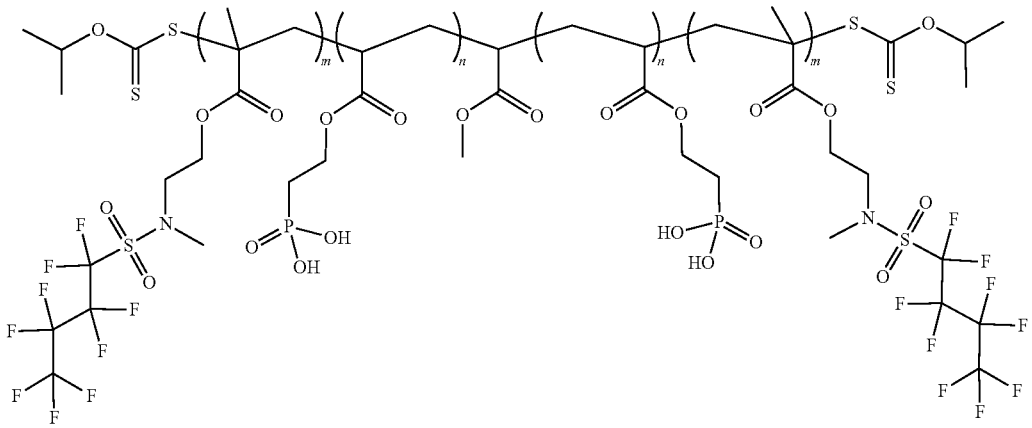

Monomer A (231 mg, 1.11 mmol), methyl 2,2-bis(isopropoxycarbothioylsulfanyl) acetate (50 mg, 0.15 mmol) and 10 g of ethyl acetate were added to a glass vial. The solution was purged with a stream of nitrogen for 10 minutes. The vial was sealed and placed on a bottle roller set at 25 revolutions per minute (rpm). Ultraviolet (UV)-initiated polymerization was conducted by irradiating the vial using a UV Benchtop lamp (UVP Blak Ray XX-15L, from Analytik Jena US, Beverly, MA) equipped with 2 bulbs (365 nm, 15W) that was placed about 3 inches from the vial. The polymerization reaction was exposed to the UV radiation for about 24 hours. The glass vial was removed from the roller and MeFBSEMA (3.98 g, 9.36 mmol) was added to the vial. The solution was purged with a stream of nitrogen for 10 minutes. The vial was sealed and returned to the roller and exposed to UV irradiation for approximately 18 hours. The mixture was then concentrated under reduced pressure to give 4.28 g of a crusty light-orange solid.

A 1.0 g sample of the white solid was dissolved in 10 mL of anhydrous $CH_2Cl_2$ and 5 mL of NOVEC 7200 under an atmosphere of nitrogen. TMSBr (0.20 mL) was added and the mixture was stirred for 4 hours. The reaction mixture was concentrated under reduced pressure and then dissolved in 10 mL of anhydrous $CH_2Cl_2$ and 5 mL of NOVEC 7200 and 2 mL of methanol and the mixture was stirred for 15 minutes. The mixture was concentrated under reduced pressure to give the title block copolymer as a white powder. NMR analysis showed complete deprotection of the phosphonate esters.

Example 3. Synthesis of BAB Block Copolymer of Monomer B and FBMA

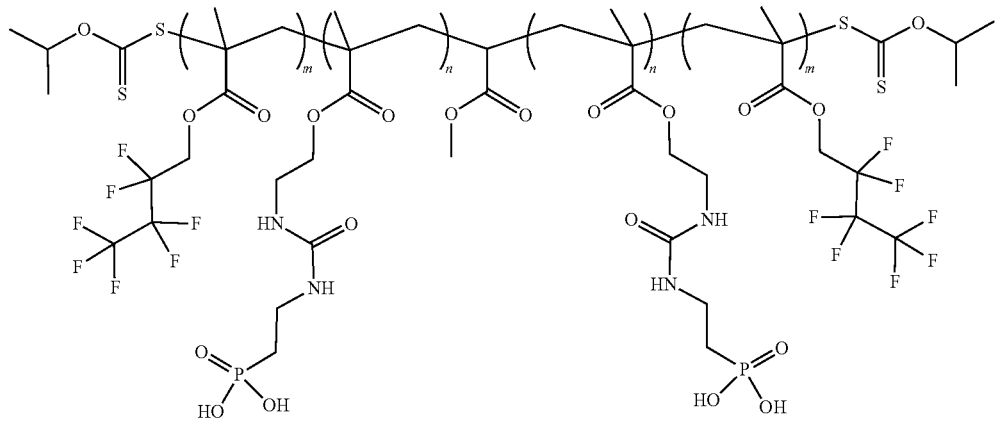

Monomer B (408 mg, 1.21 mmol), methyl 2,2-bis(isopropoxycarbothioylsulfanyl) acetate (43 mg, 0.13 mmol) and 10 g of ethyl acetate were added to a glass vial. The solution was purged with a stream of nitrogen for 10 minutes. The vial was sealed and placed on a bottle roller set at 25 revolutions per minute (rpm). Ultraviolet (UV)-initiated polymerization was conducted by irradiating the vial using a UV Benchtop lamp (UVP Blak Ray XX-15L, from Analytik Jena US, Beverly, MA) equipped with 2 bulbs (365 nm, 15W) that was placed about 3 inches from the vial. The polymerization reaction was exposed to the UV radiation for about 24 hours. The glass vial was removed from the roller and FBMA (3.20 g, 11.9 mmol) was added to the vial. The solution was purged with a stream of nitrogen for 10 minutes. The vial was sealed and returned to the roller and exposed to UV irradiation for approximately 18 hours. The mixture was then concentrated under reduced pressure to give 2.48 g of a white solid.

A 1.0 g sample of the white solid was dissolved in 10 mL of anhydrous $CH_2Cl_2$ and 5 mL of NOVEC 7100 under an atmosphere of nitrogen. TMSBr (0.20 mL) was added and the mixture was stirred for 4 hours. The reaction mixture was concentrated under reduced pressure and then dissolved in 10 mL of anhydrous $CH_2Cl_2$ and 5 mL of NOVEC 7100 and 2 mL of methanol and the mixture was stirred for 30 minutes. The mixture was concentrated under reduced pressure to give a solid. The solid was dissolved in trifluoroethanol and then treated with methanol to give a precipitate which was isolated by filtration to give 814 mg of the title block copolymer as a white powder. NMR analysis showed complete deprotection of the phosphonate esters.

Example 4. Synthesis of BAB Block Copolymer of Monomer C and FBMA

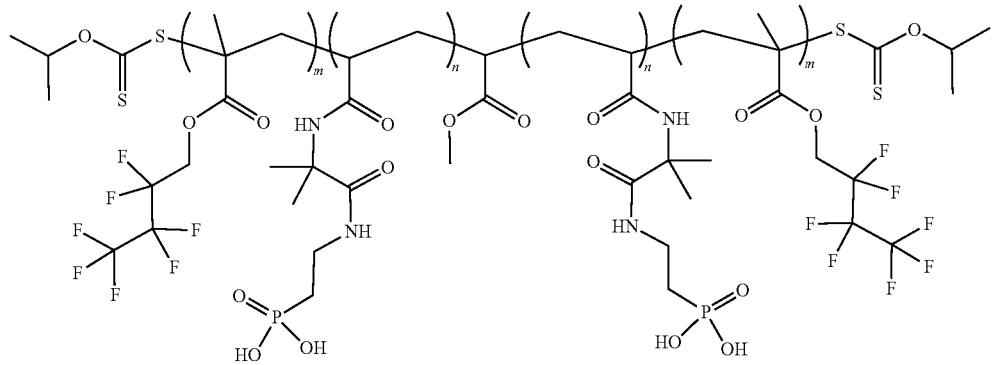

Monomer C (319 mg, 0.99 mmol), methyl 2,2-bis(isopropoxycarbothioylsulfanyl) acetate (46 mg, 0.13 mmol) and 10 g of ethyl acetate were added to a glass vial. The solution was purged with a stream of nitrogen for 10 minutes. The vial was sealed and placed on a bottle roller set at 25 revolutions per minute (rpm). Ultraviolet (UV)-initiated polymerization was conducted by irradiating the vial using a UV Benchtop lamp (UVP Blak Ray XX-15L, from Analytik Jena US, Beverly, MA) equipped with 2 bulbs (365 nm, 15 W) that was placed about 3 inches from the vial. The polymerization reaction was exposed to the UV radiation for about 18 hours. The glass vial was removed from the roller and FBMA (2.60 g, 9.7 mmol) and 10 g of ethyl acetate were added to the vial. The solution was purged with a stream of nitrogen for 10 minutes. The solution was purged with a stream of nitrogen for 10 minutes. The vial was sealed and returned to the roller and exposed to UV irradiation for approximately 18 hours. The mixture was then concentrated under reduced pressure to give 2.48 g of a white solid.

A 1.0 g sample of the white solid was dissolved in 10 mL of anhydrous $CH_2Cl_2$ and 3 mL of NOVEC 7200 under an atmosphere of nitrogen. TMSBr (0.20 mL) was added and the mixture was stirred for 3 hours. The reaction mixture was concentrated under reduced pressure and then dissolved in 10 mL of anhydrous $CH_2Cl_2$ and 3 mL of NOVEC 7200 and 2 mL of methanol and the mixture was stirred for 15 minutes. The mixture was concentrated under reduced pressure to give the title block copolymer as a white powder. NMR analysis showed complete deprotection of the phosphonate esters.

Comparative Example 1. Synthesis of Random Copolymer of Monomer A and FBMA

Monomer A (0.5 g, 2.4 mmol), methyl 2,2-bis(isopropoxycarbothioylsulfanyl) acetate (86 mg, 0.25 mmol) and FBMA (5.0 g, 18.7 mmol) were added to a glass vial and diluted with 5.6 mL of ethyl acetate. The solution was purged with a stream of nitrogen for 10 minutes. The vial was sealed and placed on a bottle roller set at 30 revolutions per minute (rpm). Ultraviolet (UV)-initiated polymerization was conducted by irradiating the vial using a UV Benchtop lamp (UVP Blak Ray XX-15L, from Analytik Jena US, Beverly, MA) equipped with 2 bulbs (365 nm, 15 W) that was placed about 3 inches from the vial. The polymerization reaction was exposed to the UV radiation for about 18 hours. The glass vial was removed from the roller and an additional portion of FBMA (1.7 g, 6.3 mmol) was added to the vial. The solution was purged with a stream of nitrogen for 10 minutes. The vial was sealed and returned to the roller and exposed to UV irradiation for approximately 18 hours. The mixture was then concentrated under reduced pressure and then concentrated from $CH_2Cl_2$ to give 5.8 g of a crusty white solid.

A 2.0 g sample of the white solid was dissolved in 10 mL of anhydrous $CH_2Cl_2$ under an atmosphere of nitrogen. TMSBr (0.35 mL) was added and the mixture was stirred overnight. The reaction mixture was concentrated under reduced pressure and then concentrated from methanol to give the title block copolymer as a yellow solid. NMR analysis showed complete deprotection of the phosphonate esters.

Comparative Example 2. Synthesis of Random Copolymer of Monomer A and MeFBSEMA Monomer A (229 mg, 1.10 mmol), methyl 2,2-bis(isopropoxycarbothioylsulfanyl) acetate (50 mg, 0.15 mmol) and MeFBSEMA (3.96 g, 9.32 mmol) were added to a glass vial and diluted with 10 g of ethyl acetate. The solution was purged with a stream of nitrogen for 10 minutes. The vial was sealed and placed on a bottle roller set at 25 revolutions per minute (rpm). Ultraviolet (UV)-initiated polymerization was conducted by irradiating the vial using a UV Benchtop lamp (UVP Blak Ray XX-15L, from Analytik Jena US, Beverly, MA) equipped with 2 bulbs (365 nm, 15 W) that was placed about 3 inches from the vial. The polymerization reaction was exposed to the UV radiation for about 18 hours. The mixture was then concentrated under reduced pressure to give 4.03 g of a crusty light-orange foam.

A 1.0 g sample of the white solid was dissolved in 10 mL of anhydrous $CH_2Cl_2$ and 5 mL of NOVEC 7200 under an atmosphere of nitrogen. TMSBr (0.20 mL) was added and the mixture was stirred for 4 hours. The reaction mixture was concentrated under reduced pressure and then dissolved in 10 mL of anhydrous $CH_2Cl_2$ and 5 mL of NOVEC 7200 and 2 mL of methanol and the mixture was stirred for 15 minutes. The mixture was concentrated under reduced pressure to give the title block copolymer as an off-white powder. NMR analysis showed complete deprotection of the phosphonate esters.

Comparative Example 3. Synthesis of Random Copolymer of Monomer B and FBMA

Monomer B (405 mg, 1.20 mmol), methyl 2,2-bis(isopropoxycarbothioylsulfanyl) acetate (41 mg, 0.12 mmol) and FBMA (3.19 g, 11.9 mmol) were added to a glass vial and diluted with 10 g of ethyl acetate. The solution was purged with a stream of nitrogen for 10 minutes. The vial was sealed and placed on a bottle roller set at 25 revolutions per minute (rpm). Ultraviolet (UV)-initiated polymerization was conducted by irradiating the vial using a UV Benchtop lamp (UVP Blak Ray XX-15L, from Analytik Jena US, Beverly, MA) equipped with 2 bulbs (365 nm, 15 W) that was placed about 3 inches from the vial. The polymerization reaction was exposed to the UV radiation for about 18 hours. The mixture was then concentrated under reduced pressure and then concentrated from $CH_2Cl_2$ and methanol to give 2.44 g of a white solid.

A 1.0 g sample of the white solid was dissolved in 10 mL of anhydrous $CH_2Cl_2$ and 5 mL of NOVEC 7100 under an atmosphere of nitrogen. TMSBr (0.20 mL) was added and the mixture was stirred for 4 hours. The reaction mixture was concentrated under reduced pressure and then dissolved in 10 mL of anhydrous $CH_2Cl_2$ and 5 mL of NOVEC 7200 and 2 mL of methanol and the mixture was stirred for 30 minutes. The mixture was concentrated under reduced pressure to give the title block copolymer as light-orange solid. NMR analysis showed complete deprotection of the phosphonate esters.

Comparative Example 4. Synthesis of Random Copolymer of Monomer C and FBMA

Monomer C (318 mg, 0.99 mmol), methyl 2,2-bis(isopropoxycarbothioylsulfanyl) acetate (47 mg, 0.14 mmol) and FBMA (2.64 g, 9.85 mmol) were added to a glass vial and diluted with 8 g of ethyl acetate. The solution was purged with a stream of nitrogen for 10 minutes. The vial was sealed and placed on a bottle roller set at 25 revolutions per minute (rpm). Ultraviolet (UV)-initiated polymerization was conducted by irradiating the vial using a UV Benchtop lamp (UVP Blak Ray XX-15L, from Analytik Jena US, Beverly, MA) equipped with 2 bulbs (365 nm, 15 W) that was placed about 3 inches from the vial. The polymerization reaction was exposed to the UV radiation for about 18 hours. The mixture was then concentrated under reduced pressure and then concentrated from $CH_2Cl_2$ and methanol to give 2.44 g of a white solid.

A 1.0 g sample of the white solid was dissolved in 10 mL of anhydrous $CH_2Cl_2$ and 3 mL of NOVEC 7200 under an atmosphere of nitrogen. TMSBr (0.20 mL) was added and the mixture was stirred for 3 hours. The reaction mixture was concentrated under reduced pressure and then dissolved in 10 mL of anhydrous $CH_2Cl_2$ and 3 mL of NOVEC 7200 and 2 mL of methanol and the mixture was stirred for 15 minutes. The mixture was concentrated under reduced pressure to give the title block copolymer as a white powder. NMR analysis showed complete deprotection of the phosphonate esters.

Example 5. Coating Composition of BAB Block Copolymer of Monomer A and FBMA

A 0.1 weight percent coating composition was prepared by diluting 100 mg of the block copolymer prepared in Example 1 with 100 mL of NOVEC 7100 in a polyethylene bottle.

Example 6. Coating Composition of BAB Block Copolymer of Monomer A and MeFBSEMA A 0.1 weight percent coating composition was prepared by diluting 250 mg of the block copolymer prepared in Example 2 with 250 mL of ethyl acetate in a glass jar.

Example 7. Coating Composition of BAB Block Copolymer of Monomer B and FBMA

A 0.1 weight percent coating composition was prepared by dissolving 250 mg of the block copolymer solution prepared in Example 3 in 5 mL of trifluoroethanol and then diluting with 250 mL of ethyl acetate in a glass jar.

Example 8. Coating Composition of BAB Block Copolymer of Monomer C and FBMA

A 0.1 weight percent coating composition was prepared by dissolving 250 mg of the block copolymer solution prepared in Example 4 in 5 mL of trifluoroethanol and then diluting to 250 mL with ethyl acetate in a glass jar.

Comparative Example 5. Coating Composition of Random Copolymer of Monomer A and FBMA A 0.1 weight percent coating composition was prepared by diluting 100 mg of the random copolymer prepared in Comparative Example 1 with 100 mL of NOVEC 7100 in a polyethylene bottle.

Comparative Example 6. Coating Composition of Random Copolymer of Monomer A and MeFBSEMA A 0.1 weight percent coating composition was prepared by diluting 250 mg of the random copolymer prepared in Comparative Example 2 with 250 mL of ethyl acetate in a glass jar.

Comparative Example 7. Coating Composition of
Random Copolymer of Monomer B and FBMA A 0.1 weight percent coating composition was prepared by dissolving 250 mg of the random copolymer solution prepared in Comparative Example 3 in 5 mL of trifluoroethanol and then diluting to 250 mL with ethyl acetate in a glass jar.

Comparative Example 8. Coating Composition of
Random Copolymer of Monomer C and FBMA A 0.1 weight percent coating composition was prepared by dissolving 250 mg of the random copolymer solution prepared in Comparative Example 4 in 5 mL of trifluoroethanol and then diluting to 250 mL with ethyl acetate in a glass jar.

Preparation of Aluminum Coupons 5-centimeter×20-centimeter aluminum coupons were sanded with 320 grit sandpaper and then washed with DI water and rinsed with IPA and allowed to dry.

Example 9. Aluminum Coupon Treated with the
Coating Composition of BAB Block Copolymer of
Monomer A and FBMA A 5-centimeter×20-centimeter aluminum coupon was treated on the bottom 10 centimeters of the coupon by applying approximately 10 mL of with the coating composition of Example 5 with a pipette. The solution was allowed to dwell on the coupon for 5 minutes and the bottom 10 centimeters of the coupon was rinsed with NOVEC 7100 and the coupon was allowed to dry for approximately 30 minutes.

Example 10. Aluminum Coupon Treated with the
Coating Composition of BAB Block Copolymer of
Monomer A and MeFBSEMA A 5-centimeter×20-centimeter aluminum coupon was treated on the bottom 10 centimeters of the coupon by placing the coupon in a beaker containing 250 mL of the coating composition of Example 6. After 30 minutes, the coupon was removed and the bottom 10 centimeters of the coupon was rinsed with ethyl acetate and the coupon was allowed to dry for approximately 30 minutes.

Example 11. Aluminum Coupon Treated with the
Coating Composition of BAB Block Copolymer of
Monomer B and FBMA A 5-centimeter×20-centimeter aluminum coupon was treated on the bottom 10 centimeters of the coupon by placing the coupon in a beaker containing 250 mL of the coating composition of Example 7. After 30 minutes, the coupon was removed and the bottom 10 centimeters of the coupon was rinsed with ethyl acetate and the coupon was allowed to dry for approximately 30 minutes.

Example 12. Aluminum Coupon Treated with the
Coating Composition of BAB Block Copolymer of
Monomer C and FBMA A 5-centimeter×20-centimeter aluminum coupon was treated on the bottom 10 centimeters of the coupon by placing the coupon in a beaker containing 250 mL of the coating composition of Example 8. After the coupon was removed and the bottom 10 centimeters of the coupon was rinsed with ethyl acetate and the coupon was allowed to dry for approximately 30 minutes.

Comparative Example 9. Aluminum Coupon
Treated with the Coating Composition of Random
Copolymer of Monomer A and FBMA A 5-centimeter×20-centimeter aluminum coupon was treated on the bottom 10 centimeters of the coupon by applying approximately 10 mL of with the coating composition of Comparative Example 5 with a pipette. The solution was allowed to dwell on the coupon for 5 minutes and the bottom 10 centimeters of the coupon was rinsed with NOVEC 7100 and the coupon was allowed to dry for approximately 30 minutes.

Comparative Example 10. Aluminum Coupon
Treated with the Coating Composition of the
Random Copolymer of Monomer A and
MeFBSEMA A 5-centimeter×20-centimeter aluminum coupon was treated on the bottom 4 inches of the coupon by placing the coupon in a beaker containing 250 mL of the coating composition of Comparative Example 6. After 30 minutes, the coupon was removed and the bottom 10 centimeters of the coupon was rinsed with ethyl acetate and the coupon was allowed to dry for approximately 30 minutes.

Comparative Example 11. Aluminum Coupon
Treated with the Coating Composition of the
Random Copolymer of Monomer B and FBMA A 5-centimeter×20-centimeter aluminum coupon was treated on the bottom 10 centimeters of the coupon by placing the coupon in a beaker containing 250 mL of the coating composition of Comparative Example 7. After 30 minutes, the coupon was removed and the bottom 10 centimeters of the coupon was rinsed with ethyl acetate and the coupon was allowed to dry for approximately 30 minutes.

Comparative Example 12. Aluminum Coupon
Treated with the Coating Composition of the
Random Copolymer of Monomer C and FBMA A 5-centimeter×20-centimeter aluminum coupon was treated on the bottom 10 centimeters of the coupon by placing the coupon in a beaker containing 250 mL of the coating composition of Comparative Example 8. After 30 minutes, the coupon was removed and the bottom 10 centimeters of the coupon was rinsed with ethyl acetate and the coupon was allowed to dry for approximately 30 minutes.

Comparative Example 13. Synthesis of FBMA
Homopolymer

FBMA (2.50 g, 9.33 mmol) and methyl 2,2-bis(isopropoxycarbothioylsulfanyl) acetate (46 mg, 0.13 mmol) were added to a glass vial and diluted with 7.5 g of ethyl acetate. The solution was purged with a stream of nitrogen for 10 minutes. The vial was sealed and placed on a bottle roller set at 25 revolutions per minute (rpm). Ultraviolet (UV)-initiated polymerization was conducted by irradiating the vial using a UV Benchtop lamp (UVP Blak Ray XX-15L, from Analytik Jena US, Beverly, MA) equipped with 2 bulbs (365 nm, 15 W) that was placed about 3 inches from the vial. The polymerization reaction was exposed to the UV radiation for about 18 hours. The mixture was then concentrated under reduced pressure to give 2.22 g of the homopolymer as a glassy white solid.

Comparative Example 14. Coating Composition of FBMA Homopolymer

A 0.1 weight percent coating composition was prepared by dissolving 250 mg of the homopolymer prepared in Comparative Example 13 with 250 mL of ethyl acetate in a glass jar.

Comparative Example 15. Aluminum Coupon Treated with the Coating Composition of FBMA Homopolymer A 5-centimeter×20-centimeter aluminum coupon was treated on the bottom 10 centimeters of the coupon by placing the coupon in a beaker containing 250 mL of the coating composition of Comparative Example 14. After 30 minutes, the coupon was removed and the bottom 10 centimeters of the coupon was rinsed with ethyl acetate and the coupon was allowed to dry for approximately 30 minutes.

Peel Test

Two strips of SCOTCH Magic Tape 810 available from 3M Company, St. Paul, MN were applied along the length of each aluminum test coupon, covering both the untreated and treated sections of the coupons, and secured using a 4 lb (1.81 kg) roller. The taped test specimens were allowed to dwell overnight at ambient conditions and then subjected to tape peels (180 degree) using a peel tester (available from IMass Inc. Accord, MA). A total of six peels were made for each strip of tape. The initial peel (approximately 1.25 cm) was made on one of the tape strips on the untreated portion of the coupon. The instrument was reset and a second 1.25 cm inch peel was made on the same strip of tape on the untreated portion. The instrument was reset and a third 1.25 cm peel was made on the untreated portion to give a total of three data points for the untreated portion of the test coupon. Tape peels were then performed on the treated portion of the aluminum coupon in a similar manner to give a total of three data points for the treated portion of the test coupon. This procedure was then repeated on the second strip of tape on the test coupon. Table 2 below shows the average peel force for each tape strip on both the untreated and treated portions of the aluminum test coupons. The peel force needed for removal of a tape strip from the treated aluminum surface can also be expressed as a percentage of the peel force needed to remove the tape strip from the bare (untreated) aluminum, and this value is recorded as the Percent Remaining Peel Force ((peel force on treated surface/peel force on bare surface)×100).

TABLE 2

| Example | | Bare Aluminum Peel force oz/in (N/dm) | Standard Deviation | Treated Aluminum Peel force oz/in (N/dm) | Standard Deviation | Percent Remaining Peel Force |
|---|---|---|---|---|---|---|
| Example 9 (BAB block copolymer) | Tape peel 1 | 20.27 (22.18) | 1.15 (1.26) | 11.65 (12.75) | 0.10 (0.11) | 57 |
| | Tape peel 2 | 21.65 (23.70) | 0.65 (0.71) | 11.97 (13.10) | 0.25 (0.27) | 55 |
| Comparative Example 9 (random copolymer) | Tape peel 1 | 21.49 (23.52) | 0.71 (0.78) | 17.52 (19.18) | 0.80 (0.88) | 82 |
| | Tape peel 2 | 22.23 (24.33) | 0.69 (0.76) | 17.39 (19.03) | 0.19 (0.21) | 78 |
| Example 10 (BAB block copolymer) | Tape peel 1 | 24.02 (26.29) | 0.51 (0.56) | 16.12 (17.64) | 0.29 (0.32) | 67 |
| | Tape peel 2 | 24.58 (26.90) | 0.47 (0.51) | 16.66 (18.23) | 0.22 (0.24) | 68 |
| Comparative Example 10 (random copolymer) | Tape peel 1 | 23.23 (25.43) | 0.42 (0.46) | 20.17 (22.08) | 0.42 (0.46) | 87 |
| | Tape peel 2 | 22.50 (24.62) | 0.35 (0.38) | 19.94 (21.83) | 0.54 (0.59) | 89 |
| Example 11 (BAB block copolymer) | Tape peel 1 | 25.16 (27.54) | 0.86 (0.94) | 18.32 (20.05) | 0.38 (0.42) | 73 |
| | Tape peel 2 | 25.19 (27.57) | 0.66 (0.72) | 18.13 (19.84) | 1.05 (1.15) | 72 |
| Comparative Example 11 (random copolymer) | Tape peel 1 | 22.68 (24.82) | 0.18 (0.20) | 18.18 (19.90) | 0.54 (0.59) | 80 |
| | Tape peel 2 | 24.81 (27.15) | 0.52 (0.57) | 18.40 (20.13) | 0.37 (0.40) | 74 |
| Example 12 (BAB block copolymer) | Tape peel 1 | 24.84 (27.19) | 0.54 (0.59) | 19.51 (21.35) | 0.47 (0.51) | 79 |
| | Tape peel 2 | 24.32 (26.62) | 0.59 (0.65) | 18.87 (20.65) | 0.51 (0.56) | 78 |
| Comparative Example 12 (random copolymer) | Tape peel 1 | 24.04 (26.31) | 1.61 (1.76) | 20.71 (22.67) | 0.59 (0.65) | 86 |
| | Tape peel 2 | 21.05 (23.04) | 0.48 (0.53) | 20.27 (22.19) | 0.60 (0.66) | 96 |
| Comparative Example 15 (FBMA homopolymer) | Tape peel 1 | 23.05 (25.23) | 0.57 (0.62) | 22.29 (24.40) | 0.29 (0.32) | 97 |
| | Tape peel 2 | 23.15 (25.34) | 0.14 (0.15) | 22.89 (25.05) | 0.08 (0.09) | 99 |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A composition comprising:
   a triblock copolymer comprising:
   one A block comprising multiple monomeric units derived from a first monomer comprising a (meth)acryloyl group and a phosphorus-containing group; and
   two B blocks with each B block comprising multiple monomeric units derived from a second monomer selected from at least one of:
   $C_nF_{(2n+1)}(CH_2)_zOC(=O)CR^5=CH_2$ (Formula (II)), wherein n is an integer selected from 1 to 6, z is an integer selected from 1 to 20, and $R^5$ is H or $CH_3$; or
   $C_pF_{(2p+1)}SO_2(NR^6)(CH_2)_qOC(=O)CR^7=CH_2$ (Formula (III)), wherein p is an integer selected from 1 to 6, q is an integer selected from 2 to 20, R6 is H or C1-C8 alkyl group, and $R^7$ is H or $CH_3$;
   wherein the triblock copolymer comprises 1 to 30 weight percent A block and 70 to 99 weight percent B block based on a total weight of the block copolymer; and
   one or more organic solvents, wherein the block copolymer is dissolved or dispersed in the organic solvents.

2. The composition of claim 1, wherein the first monomer is of Formula (I)

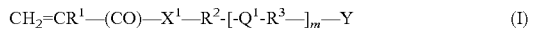

$$CH_2=CR^1—(CO)—X^1—R^2-[-Q^1-R^3—]_m—Y \quad (I)$$

wherein
$R^1$ is hydrogen or methyl;
$X^1$ is oxy or $—NR^4—$;
$R^2$ is an alkylene or heteroalkylene;
$R^3$ is an alkylene;
$Q^1$ is $—(CO)X^2—$, $—NR^4—(CO)—X^2—$;
$X^2$ is oxy or $—NR^4—$;
$R^4$ is hydrogen or alkyl;
m is 0 or 1; and
Y is a phosphorus-containing group.

3. The composition of claim 2, wherein Y is $—P(O)(OH)_2$.

4. The composition of claim 3, wherein the first monomer is of Formula (I-A), wherein m=0:

$$CH_2=CR^1—(CO)—X^1—R^2-Y \quad (I\text{-}A).$$

5. The composition of claim 4, wherein the first monomer is $CH_2=CH—(CO)—O—CH_2CH_2—P(O)(OH)_2$.

6. A composition, comprising:
   a triblock copolymer comprising:
   one A block comprising multiple monomeric units derived from a first monomer of formula (I-B):

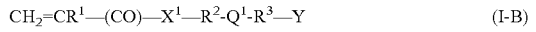

$$CH_2=CR^1—(CO)—X^1—R^2-Q^1-R^3—Y \quad (I\text{-}B)$$

wherein Y=$PO(OH)_2$; and
two B blocks with each B block comprising multiple monomeric units derived from a second monomer selected from at least one of:

$C_nF_{(2n+1)}(CH_2)_zOC(=O)CR^5=CH_2$ (Formula (II)), wherein n is an integer selected from 1 to 6, z is an integer selected from 1 to 20, and $R^5$ is H or $CH_3$; or
$C_pF_{(2p+1)}SO_2(NR^6)(CH_2)_qOC(=O)CR^7=CH_2$ (Formula (III)), wherein p is an integer selected from 1 to 6, q is an integer selected from 2 to 20, R6 is H or C1-C8 alkyl group, and R7 is H or $CH_3$; and
one or more organic solvents, wherein the block copolymer is dissolved or dispersed in the organic solvents.

7. The composition of claim 6, wherein the first monomer is $CH_2=CH—(CO)—NH—C(CH_3)_2—(CO)—NH—CH_2CH_2—P(O)(OH)_2$ or $CH_2=CR^1—(CO)—O—CH_2CH_2—NH—(CO)—NH—CH_2CH_2—P(O)(OH)_2$.

8. The composition of claim 1, wherein the second monomer is of Formula (II), wherein n is an integer selected from 1 to 6, z is an integer selected from 1 to 6, and $R^5$ is H or $CH_3$.

9. The composition of claim 1, wherein the second monomer is of Formula (III), wherein p is an integer selected from 1 to 6, q is an integer selected from 2 to 4, $R^6$ is H or C1-C3 alkyl group, and $R^7$ is H or $CH_3$.

10. The composition of claim 1, wherein the second monomer is selected from:
$CF_3CF_2CF_2CH_2—O—C(=O)C(CH_3)=CH_2$; and
$CF_3CF_2CF_2CF_2—S(=O)2N(CH_3)CH_2CH_2—O—C(=O)C(CH_3)=CH_2$.

11. The composition of claim 1, wherein the block copolymer is of Formula (VIII):

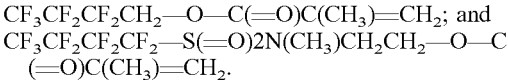

(VIII)

wherein:
$R^{10}$ is an alkyl, alkoxy, or group of formula $—N(R^{12})_2$;
$R^{11}$ is an alkoxy or a group of formula $—N(R^{13})_2$;
each $R^{1\text{-}3}$ is an alkyl;
each A is a first polymeric block that is a polymerized product of a first polymerizable composition comprising first monomers of Formula (I):

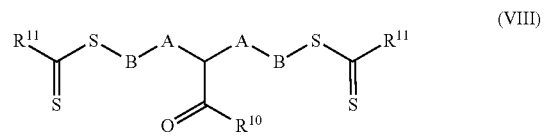

$$CH_2=CR^1—(CO)—X^1—R^2-[-Q^1-R^3—]_m—Y \quad (I); \text{ and}$$

each B is a second polymeric block that is a polymerized product of a second polymerizable composition comprising monomers of Formulas (II) and/or (III).

12. An article comprising:
a) a metal-containing substrate; and
b) a coating layer positioned adjacent to the substrate, wherein the coating layer comprises a block copolymer of claim 1.

13. A composition comprising:
a triblock copolymer comprising:
one A block comprising multiple monomeric units derived from a first monomer comprising a (meth)acryloyl group and a phosphorus-containing group; and
two B blocks with each B block comprising multiple monomeric units derived from a second monomer of Formula (III),

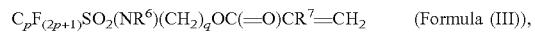

$$C_pF_{(2p+1)}SO_2(NR^6)(CH_2)_qOC(=O)CR^7=CH_2 \quad (Formula\ (III)),$$

wherein p is an integer selected from 1 to 6, q is an integer selected from 2 to 4, $R^6$ is H or Cl-C3 alkyl group, and $R^7$ is H or $CH_3$.

* * * * *